May 26, 1942.  R. C. GILBERT  2,284,051
VACUUM BREAKER
Filed Nov. 22, 1940

INVENTOR
RUSSELL C. GILBERT
BY
ATTORNEYS

Patented May 26, 1942

2,284,051

UNITED STATES PATENT OFFICE 2,284,051

VACUUM BREAKER

Russell C. Gilbert, South Bend, Ind., assignor to Bendix Home Appliances, Inc., South Bend, Ind., a corporation of Delaware Application November 22, 1940, Serial No. 366,592

10 Claims. (Cl. 251—118)

This invention relates to vacuum breakers and more particularly to devices for preventing siphoning back of fouled water or the like into water supply pipes upon a failure of supply pressure.

One of the objects of the invention is to provide a vacuum breaker in which a positive pressure can be transmitted from the inlet to the outlet. By positive pressure, a pressure above atmospheric not dependent solely on velocity is meant.

Another object of the invention is to provide a vacuum breaker having an atmospheric vent which is closed during flow from the inlet to the outlet side and which at other times is open to the outlet side. According to one important feature, closing of the vent before any flow can take place is assured.

Still another object of the invention is to provide a vacuum breaker in which the inlet side is closed at all times except during actual flow from the inlet to the outlet.

The above and other objects, advantages and novel features of the invention will be apparent from the following description when read in connection with the accompanying drawing, in which.

Figure 2:
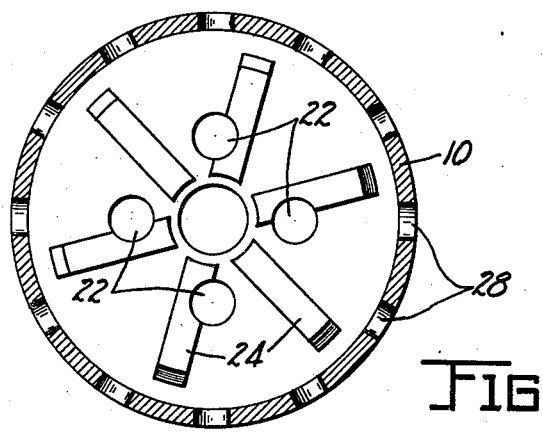
Figure 2 is a section on the line 2—2 of Figure 1.

The illustrated vacuum breaker comprises an outer cylindrical casing 10 closed at one end by an end closure 12 having an inlet pipe 14 projecting centrally therethrough. An outlet pipe 16 is connected to the end closure 12. Within the cylindrical shell 10 there is mounted a member 18 formed at one end with a spherical wall 20 perforated at 22 by a series of vent openings and having a series of spacer baffles 24 arranged over its top, which serve to space it from the top closure 26. The cylindrical casing 10 is formed around its periphery with a series of atmospheric vents 28 communicating past the spacer blocks 24 with the vent openings 22.

The inlet pipe 14 carries within the casing a spherical or globular end portion 30, which may be screwed to the end of the inlet pipe and which is formed with an opening 32 communicating with the opening in the inlet pipe. The spherical portion 30, which may be provided with a shallow V groove 33, is inclosed by a flexible shell 34 of rubber or the like in the form of a hollow sphere with an opening cut in its lower portion to fit over the member 30.

Figure 1:
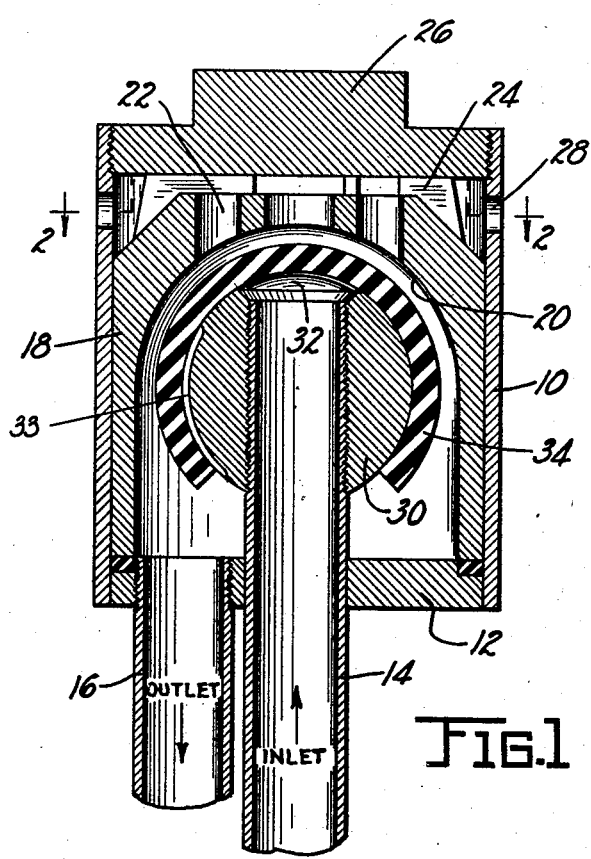
Figure 1 is a section through a vacuum breaker embodying the invention.

Normally, the shell 34 fits closely against the spherical member 30 as shown in Figure 1 and closes the inlet opening 32. At this time the outlet pipe 16 is in open communication with the vent openings 22 and with atmosphere through the openings 28 in the shell 10. When fluid pressure is admitted to the inlet pipe 14, as for example by opening a valve in the inlet pipe, the shell 34 first will be moved upwardly while its skirt clings to the spherical member 30, and then the shell 34 will be further expanded by such pressure until it seats against the spherical surface 20 and closes the vent openings 22. Thereafter, the pressure will further expand the shell 34 to move the skirt portion thereof away from the spherical member 30, so that fluid may escape between the shell and the member 30, and through the casing and out through the outlet pipe 16. Due to the fact that the vent openings 22 are completely closed at this time, a positive pressure may be applied to the outlet pipe 16. The tortuous path of the passage through openings 22, past baffles 24 and through openings 28 prevents the discharge of spray and also prevents injury to the rubber shell 34 by insertion of a sharp instrument by a person who does not understand the mechanism.

When the pressure on the inlet pipe is removed, as by closing a valve therein, the shell 34 by its own physical contraction will again seal against the spherical member 30 and will return to its position as shown in Figure 1, to close the outlet 32 and to reestablish communication between the outlet pipe 16 and the vents 22. The fluid between the contracting member 34 and the spherical member 30 may escape through the V groove 33. If, at this time, a vacuum should be created in the supply line 14, it will serve only to pull the shell 34 closer against the member 30 and will not tend to siphon fouled liquid or the like from the outlet pipe 16, since this pipe is in free communication with the atmosphere.

A vacuum breaker of this type is particularly useful in connection with installations such as washing machines or the like in which connections are made to water supply pipes. The invention is, however, capable of use in other locations where the prevention of siphoning or backflow into a supply pipe is desired.

While one embodiment of the invention has been illustrated and described in detail, it will be understood that this embodiment is not intended as a definition of the scope of the invention, reference being had for that purpose to the appended claims.

What is claimed is:

1. A vacuum breaker comprising a casing formed with a vent opening, an inlet pipe having an enlarged and undercut end within the casing, an outlet pipe from the casing, and a flexible member fitting over the enlarged end of the inlet pipe and engaging the undercut portion thereof and adapted to be forced into a position to close the vent opening and to open the inlet pipe by pressure in the inlet pipe.

2. A vacuum breaker comprising a casing formed with a vent opening, an inlet pipe having an enlarged and undercut end within the casing, an outlet pipe from the casing, and a resilient cup-shaped member fitting over and normally sealing against the enlarged end of the inlet pipe normally closing the opening therefrom and held in such position by its resilient engagement with the undercut part of the enlarged end and adapted to be forced into a position to close the vent opening and to open the inlet pipe by pressure in the inlet pipe.

3. A vacuum breaker comprising a casing formed with a vent opening, an inlet pipe extending into the casing, an outlet from the casing, a ball member carried by the inlet pipe in the casing and surrounding the inlet opening, and a hollow ball-shaped shell of resilient material fitting over the ball member normally closing the inlet opening and adapted to be forced into a position to close the vent opening and to open the inlet opening by pressure in the inlet pipe.

4. A vacuum breaker comprising a casing formed at one end with an internal spherical wall having a vent opening therethrough, an inlet pipe extending into the casing and terminating in an enlarged spherical end portion, and a hollow parti-spherical shell of resilient material fitting over said end portion normally closing the inlet opening and adapted to be forced into engagement with the spherical wall by pressure in the inlet pipe to close the vent opening and to open the inlet opening.

5. In a vacuum breaker or the like, an inlet part having an undercut thereon and a resilient hollow member fitting over and normally closing the inlet having a contracted skirt resiliently engaging the undercut thereof, the base of said resilient hollow member being adapted to be forced away from the inlet and the skirt forced away from the undercut part by the pressure within the resilient hollow member.

6. In a vacuum breaker or the like, an inlet pipe terminating in an enlarged spherical end having a discharge opening therein and a hollow imperforate parti-spherical shell of resilient material fitting over said end and normally closing the discharge opening and contracting about the spherical end but adapted to be forced away from it by pressure in the inlet pipe, whereby fluid may escape from the inlet pipe around the spherical end and past the opening of the parti-spherical resilient shell.

7. In a vacuum breaker, an inlet pipe terminating in an enlarged spherical end having a discharge opening therein and a hollow imperforate parti-spherical shell of resilient material having a lip portion contracted over said end, the base portion of said shell normally closing the discharge opening but adapted to be forced away from it by pressure in the inlet opening to permit escape of fluid between the lip of said shell and the spherical terminus of the inlet pipe, the resilience of said parti-spherical shell serving to retract it into contact with said enlarged spherical end when the pressure in the inlet pipe ceases.

8. In a vacuum breaker, an inlet pipe terminating in a globular member, a shell of resilient material surrounding said globular member, a member surrounding said shell and normally spaced therefrom, said latter member having one or more openings therein communicating with the atmosphere, the shell having a skirt contracted against the surface of the globular member, whereby when pressure is produced within the shell it will be expanded first to contact said member surrounding the shell at the region of said one or more atmospheric openings therein to close said one or more atmospheric openings, and then to separate the skirt portion of said shell from the globular member to permit fluid to flow from within the shell to the space surrounding the shell, and a discharge pipe connecting with the space surrounding said shell.

9. A vacuum breaker comprising a shell having inlet and outlet pipes connected therewith, a knob within the shell having an opening therethrough connected with the inlet pipe, a rubber member fitting over said knob and resiliently engaging it about a portion thereof of less diameter than the largest diameter and remote from the inlet opening through the knob, whereby the contraction of said rubber member causes it to fit snugly against the external surface of said knob, one of the contacting members having a groove therein extending from the line of engagement of the brim of said rubber member with said knob to a position near the inlet opening through said knob, whereby fluid entrapped between the knob and the rubber member will gradually escape into said shell to permit the rubber member to contract snugly about said knob to close the opening through said knob, said rubber member being of such flexibility and normal contraction that pressure from the inlet pipe will expand the rubber member and permit flow of fluid from the opening through said knob around the surface thereof between the rubber member and the knob and past the lip of said rubber member.

10. A vacuum breaker comprising a shell having inlet and outlet pipes connected therewith, a knob within the shell having an opening therethrough connected with the inlet pipe, a vent opening through the shell opposite the inlet opening through said knob, a rubber member fitting over said knob and resiliently engaging it about a portion thereof of less diameter than the largest diameter and remote from the inlet opening through the knob, whereby the contraction of said rubber member causes it to fit snugly against the external surface of said knob, the rubber being of less thickness than the space between the inlet opening in the knob and the vent opening in the shell, one of the contacting members having a groove therein extending from the line of engagement of the brim of said rubber member with said knob to a position near the inlet opening through said knob, whereby fluid entrapped between the knob and the rubber member will gradually escape into said shell to permit the rubber member to contract snugly about said knob to close the opening through said knob, said rubber member being of such flexibility and normal contraction that pressure from the inlet pipe will expand the rubber member and permit flow of fluid from the opening through said knob around the surface thereof between the rubber member and the knob and past the lip of said rubber member and will move the rubber member on the knob to seal the vent opening.

RUSSELL C. GILBERT.